(12) United States Patent
Villaume et al.

(10) Patent No.: US 8,280,562 B2
(45) Date of Patent: Oct. 2, 2012

(54) METHOD AND DEVICE CONCERNING THE TAXIING OF AN AIRCRAFT, WHICH IS AUTOMATIC AT LEAST IN PART

(75) Inventors: Fabrice Villaume, Seysses (FR); Pierre Scacchi, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 331 days.

(21) Appl. No.: 12/330,361

(22) Filed: Dec. 8, 2008

(65) Prior Publication Data

US 2009/0150009 A1    Jun. 11, 2009

(30) Foreign Application Priority Data

Dec. 11, 2007 (FR) ...................................... 07 08595

(51) Int. Cl.
*G01C 23/00* (2006.01)
(52) U.S. Cl. ............................... 701/3; 701/23; 701/120
(58) Field of Classification Search ................ 700/3, 17, 700/23, 117, 120, 200, 202; 701/3, 17, 23, 701/117, 120, 200, 202, 11
See application file for complete search history.

(56) References Cited

U.S. PATENT DOCUMENTS

| | | | | | |
|---|---|---|---|---|---|
| 4,122,522 | A | * | 10/1978 | Smith | 701/15 |
| 4,482,961 | A | * | 11/1984 | Kilner et al. | 701/16 |
| 5,913,376 | A | * | 6/1999 | Takei | 180/168 |
| 7,014,146 | B2 | * | 3/2006 | Villaume et al. | 244/111 |
| 7,499,795 | B2 | * | 3/2009 | Fetzmann et al. | 701/120 |
| 7,630,829 | B2 | * | 12/2009 | Pepitone | 701/120 |
| 7,772,992 | B2 | * | 8/2010 | Fetzmann et al. | 340/961 |
| 2007/0208466 | A1 | * | 9/2007 | Meunier | 701/16 |

FOREIGN PATENT DOCUMENTS

| | | | |
|---|---|---|---|
| EP | 1 496 413 | | 1/2005 |
| EP | 1 835 369 | | 9/2007 |
| FR | 2 895 726 | | 7/2007 |
| WO | WO2006/106210 | * | 3/2006 |

OTHER PUBLICATIONS

Preliminary Search Report dated Jun. 16, 2008 w/ English translation.

* cited by examiner

*Primary Examiner* — Behrang Badii
*Assistant Examiner* — Shardul Patel
(74) *Attorney, Agent, or Firm* — Dickinson Wright PLLC (57) ABSTRACT

A method and device automatically controls the driving of an aircraft along a ground path of an airport domain. A guidance system is configured to determine, with the aid of at least one current value of the aircraft and a ground rolling trajectory, a yaw rate setpoint enabling the aircraft to follow the ground rolling trajectory by application of a yaw rate command. The guidance system, with the aid of measured current values of parameters of the aircraft, the determined ground rolling trajectory and a speed profile that incorporates a variation of the longitudinal speed along the ground trajectory, a longitudinal speed setpoint that represents a longitudinal speed command to drive the aircraft along the ground trajectory, while complying with the speed profile. A piloting aid system calculates setpoints from the yaw rate command and applies the setpoints to control yaw motion of the aircraft.

4 Claims, 5 Drawing Sheets

METHOD AND DEVICE CONCERNING THE TAXIING OF AN AIRCRAFT, WHICH IS AUTOMATIC AT LEAST IN PART

FIELD OF THE INVENTION

The present invention relates to a method and device for the at least partially automatic driving of an aircraft rolling on the ground, on an airport domain such as an airport or an aerodrome.

The present invention therefore applies to the rolling of an aircraft on the ground, in particular an airplane, civil or military, for transporting passengers or merchandise (freight), or else a drone. It relates more particularly to the total or partial automation of the driving of such an aircraft rolling on the ground.

BACKGROUND OF RELATED ART

Within the framework of the present invention, the following meanings are implied:
rolling on the ground implies any type of possible rolling of an aircraft, such as rolling on a landing runway in the course of the landing and takeoff phases, or rolling on trafficways or on maneuvering areas, in particular;
automation implies the action of a system capable of ensuring, partially or totally, that is to say without aid or with the partial aid of a human, the driving of an aircraft on the ground; and
driving implies the action of directing the progress, or movements, of the aircraft on the ground.

Currently, the pilot controls the aircraft's ground movements, by virtue of manual piloting facilities (for example a steering wheel allowing orientation of the wheel of the front landing gear, a lever for controlling the thrust of the engines, brake pedals, a directional rudder bar), along a ground trajectory. These facilities make it possible to control actuators of the aircraft capable of influencing the movements of the aircraft, in particular by way of the engines, the brakes, the orientation of the wheel of the front landing gear (and optionally the orientation of the rear gear), as well as the rudder of the fin.

The term ground trajectory designates the pathway followed by the aircraft on an airport domain such as an aerodrome or an airport, including in particular the takeoff and landing runways, the trafficways or taxiways, the turn-around areas, the waiting zones, the stop bars, the stopping positions (stand), the maneuvering areas, and the parking areas.

The ground trajectory is generally provided to the pilot, in particular by way of radiocommunication means or another standard means such as a digital data transmission link, by an air traffic controller or by a ground controller, but it can also, in certain cases, be chosen freely by the pilot.

The trajectory is defined in the form of a succession of elements of the airport domain, and it indicates a pathway making it possible to reach, from one point or region of the airport domain, another point or region of this domain.

Any portion of the domain, whether or not designated by a name, and identified as a distinct and delimited part of the domain, is called an element of the airport domain. An element may optionally overlap one or more others. The takeoff and landing runways, the trafficways or taxiways, the turn-around areas, the waiting zones, the stop bars, the stopping positions (stand), the maneuvering areas and the parking areas are in particular designated as elements.

Knowing the ground trajectory to be followed, the pilot acts on the aforesaid piloting facilities, so as to control the movements of the aircraft on the ground (the longitudinal speed and the lateral displacements of the aircraft). He does so also in order to follow the trajectory in such a way that all the parts of the aircraft in contact with the ground (the wheels of the front and rear gear) remain permanently on the pavement designed for aircraft rolling. For most airports accommodating civil or military transport airplanes, the term "ground" implies the parts covered with tarmac and designed for this purpose. The pilot's objective is therefore to manage a trajectory so that none of the parts of the aircraft in contact with the ground lies at a given moment on a portion of the airport domain that is not designed for the rolling of the aircraft, in particular portions covered with grass, earth or sand, or portions designed solely for the rolling of lighter vehicles (cars, trucks).

The manual piloting of an aircraft on the ground constitutes a significant workload for the pilot. The latter must in fact follow the envisaged trajectory by controlling at one and the same time the speed of the aircraft (with the aid of the engine thrust levers and brake pedals), and the rotation about the yaw axis (with the aid of the steering wheel and rudder bar), while taking care not to depart from the pavement designed for the rolling of the aircraft, and while simultaneously monitoring the exterior environment, and in particular:
the movements of the other vehicles traveling around the airport domain, in particular aircraft currently rolling on the ground, taking off or landing, cars, trucks, etc.; and
the obstacles present around the aircraft and liable to cause a collision with the latter, in particular buildings, gangways, antennas, indication and signaling panels, and other vehicles on the ground, stationary or otherwise (aircraft, cars, trucks, mobile gangways).

This significant workload may, consequently, influence the pilot's vigilance, and lead, in particular, to the following of an unplanned trajectory, departures from the pavement designed for the rolling of the aircraft, and collisions with other vehicles or obstacles that may lead to significant damage to equipment and humans.

When conditions exist that are detrimental to the visibility (for the pilot) of the exterior environment, in particular at night or during unfavorable meteorological conditions (fog, snow, rain, storms, etc.), the pilot may be dependent on exterior aid for piloting the aircraft, for example the aid of a vehicle to be followed which makes it possible to guide the aircraft visually along the trajectory by traveling ahead of it at low speed. Dependence on exterior aid such as this is often penalizing for airlines, since the low-speed movement of the aircraft may induce delays in the envisaged timetables. In certain cases, in particular in the event of extreme meteorological conditions, the airport traffic may even remain totally paralyzed if the exterior aid turns out to be ineffective, thus leading to delays and significant costs for the airlines. The efficiency of the traffic flow over the airport domain is greatly affected with major financial impacts for all payees (airport, control, airlines).

Additionally, the driving of aircraft of significant length can be difficult to achieve, in particular during turns, because of the significant wheelbase between the front and rear gear. Under these conditions, it is, in fact, more difficult to drive the aircraft so that all the parts in contact with the ground remain on the pavement designed for the rolling of the aircraft, thereby requiring the use of additional pilot aids, for example the employing of exterior cameras allowing the pilot to verify that the wheels of the front gear do not depart from the pavement (the case of the AIRBUS transport airplanes of the A 380 and A340-600 types).

Furthermore, the manual piloting of an aircraft on the ground is not optimal in terms of time spent while rolling along the trajectory, or in terms of use and wear of the actuators. Neither can the pilot accurately predict the arrival time at the end of the trajectory. These limitations impinge in particular on the maintenance costs and availability of aircraft for airlines, as well as on the congestion of large national and international airports and on the delays penalizing both the airlines and passengers. Finally, this absence of optimization of airport operations has a strong and negative impact on the environment (noise, pollution, etc.).

SUMMARY OF THE INVENTION

The object of the present invention is to remedy the aforesaid drawbacks. It relates to a method of driving (which is at least partially automatic) an aircraft rolling on the ground on an airport domain.

For this purpose, according to the invention, said method is noteworthy in that, in a repetitive manner:

A/ a navigation function is implemented, for which:
  a) information is received relating to a path to be followed;
  b) with the aid of said information, a ground rolling trajectory is automatically determined;

B/ a guidance function is implemented, for which:
  a) the current values of parameters of the aircraft are automatically measured;
  b) with the aid of at least certain of said current values and of said ground rolling trajectory, a yaw rate setpoint enabling the aircraft to follow said ground rolling trajectory is automatically determined; and C/ a function for aiding piloting is implemented, for which an onboard piloting aid system uses said yaw rate setpoint to aid the piloting of the aircraft.

Thus, by virtue of the invention, at least one part of the driving of an aircraft rolling on the ground is carried out in an automatic manner, namely in particular at least one part of the navigation function consisting in automatically determining a ground rolling trajectory, as well as at least one part of the guidance function consisting in automatically determining a yaw rate setpoint enabling the aircraft to follow this ground rolling trajectory. Consequently, by virtue of the invention, it is possible to remedy the aforesaid drawbacks, as is specified further below.

In a first embodiment:
calculation means forming part of said piloting aid system calculate, automatically, commands able to be applied to first control means which act on the yaw motion of the aircraft rolling on the ground, said commands being such that applied to said first control means the latter pilot the aircraft laterally according to said yaw rate setpoint so that it follows said ground rolling trajectory; and means forming part of said piloting aid system apply the commands thus calculated automatically to said first control means.

By virtue of this first embodiment, the lateral piloting of the aircraft along the ground rolling trajectory is carried out in an automatic manner. Consequently, in this first embodiment, the whole of the lateral driving of the aircraft (intended to allow it to follow the aforesaid trajectory) is carried out in an automatic manner, thereby making it possible in particular to reduce the workload of the pilot during this ground rolling phase.

Furthermore, as a supplement or as a variant to this first embodiment, in a second embodiment, display means forming part of said piloting aid system present, on at least one viewing screen, first characteristic signs illustrating said yaw rate setpoint.

In this second embodiment, the piloting of the aircraft along the ground rolling trajectory can be carried out automatically or manually, depending on whether it is or is not implemented simultaneously with the first aforesaid embodiment. When the piloting is carried out manually, its implementation is facilitated by virtue of the display carried out by said display means. This second embodiment (when it is not combined with said first embodiment) therefore relates to a lateral driving that is semiautomatic since only the navigation and guidance functions are automatic, whereas the piloting function is carried out manually, but with valuable aid provided by said display means.

Additionally, in a preferred embodiment, the following operations are also carried out:

in step A/:
  c) constraints are received relating to the rolling of the aircraft on the airport domain;
  d) with the aid of said constraints, a speed profile which is suited to said ground rolling trajectory is automatically determined, said speed profile being such that it provides a variation of the longitudinal speed while the aircraft is rolling along said trajectory;

in step B/, a longitudinal speed setpoint which represents a longitudinal speed command enabling the aircraft to be made to roll on the ground along said trajectory while complying with said speed profile is automatically determined with the aid of measured current values of the aircraft, of said trajectory and of said speed profile; and in step C/, the piloting aid system uses said yaw rate setpoint to aid the piloting of the aircraft.

Within the framework of the present invention, the expression speed profile (associated with a trajectory) is understood to mean a set of speed values corresponding to a set of positions along this trajectory (or of time values), the two sets possessing the same number of elements.

By virtue of this preferred embodiment, a method for the longitudinal driving of the aircraft, which is at least partially automatic, is obtained.

In a first variant embodiment (of this preferred embodiment), in step C/:

calculation means forming part of said piloting aid system calculate, automatically, commands able to be applied to second control means which act on the speed of the aircraft, said commands being such that applied to said second control means the latter pilot the aircraft longitudinally according to said longitudinal speed setpoint; and means forming part of said piloting aid system apply the commands thus calculated automatically to said second control means.

By virtue of this first variant embodiment, the longitudinal driving of the aircraft along the rolling trajectory, which is such that the aircraft complies with said speed profile, is carried out in a completely automatic manner, since the navigation, guidance and piloting aid functions are all carried out automatically.

By combining this first variant embodiment with the first aforesaid embodiment (relating to automatic lateral driving), completely automatic (longitudinal and lateral) driving of the aircraft rolling on the ground is obtained.

Furthermore, in a second variant embodiment, in step C/, display means forming part of said piloting aid system present, on at least one viewing screen, second characteristic signs illustrating said longitudinal speed setpoint.

In this second variant embodiment, the longitudinal piloting of the aircraft making it possible to comply with the speed profile can be carried out in a manual manner by the pilot, who is, in this case, aided by the display implemented by said display means.

Said first and second variant embodiments can also be combined so as to obtain automatic driving with an aid for the pilot in the form of a presentation of information.

Additionally, the following operations are moreover carried out in an advantageous manner:
- at least one of the following deviations of the aircraft with respect to said ground rolling trajectory is determined: a lateral deviation and an angular deviation;
- this deviation is compared with a predetermined corresponding limit value; and
- if this deviation overshoots said corresponding limit value, at least one first protection function intended to aid the elimination of this overshoot is implemented.

Furthermore, advantageously, the following operations are also carried out:
- the current speed of the aircraft is measured;
- a speed deviation between the measured current speed of the aircraft and a speed prescribed by said speed profile is determined;
- this deviation is compared with a predetermined corresponding limit value; and
- if this deviation overshoots said corresponding limit value, at least one second protection function intended to aid the elimination of this overshoot is implemented.

Additionally, in a particular embodiment, the following operations are also carried out:
- the current position of the aircraft is determined;
- a check is carried out to verify that this current position is consistent in relation to the ground rolling trajectory; and
- if said current position is not consistent, at least one third protection function intended to aid the elimination of this inconsistency is implemented.

Furthermore, advantageously:
- when it is impossible to determine a yaw rate setpoint because of a fault, the aircraft is brought automatically into a direct manual piloting mode; and/or
- a ground protection envelope is determined and this ground protection envelope is used to modulate a speed command.

Additionally, in a particular embodiment, said method in accordance with the invention is activated, if the following conditions are fulfilled simultaneously:
- it has been previously armed;
- the aircraft is on the ground;
- the current position and the current heading of the aircraft are consistent with a first element of the ground rolling trajectory; and
- the current longitudinal speed of the aircraft is compatible with an envelope of admissible maximum speeds.

Consequently, by virtue of the invention, on the basis of a path provided in particular by the air traffic controller or the ground controller in the form, for example, of a succession of names of elements of the airport domain to be followed successively, or in any other form describing the journey to be followed, whatever means of communication is used between the controller and the aircraft, in particular by radiocommunication means, or by any other computerized means, and on the basis of reference points of the airport domain, or any other means of representing in one manner or another the constituent elements of the airport domain, the method in accordance with the invention makes it possible to generate speed setpoints which are intended for means of automatic control (or for display means) of the aircraft and which are such that the aircraft follows the ground rolling trajectory envisaged, without the parts in contact with the ground departing from the pavement designed for rolling, doing so at a speed compatible with airport regulations or with any other speed constraint.

The present invention also relates to an at least partially automatic device for driving an aircraft, in particular a transport airplane, which rolls on the ground on an airport domain.

According to the invention, this device is noteworthy in that it is embedded onboard and comprises:
- means for entering information relating to a path to be followed;
- means for automatically measuring the current values of parameters of the aircraft;
- a navigation system which comprises means for automatically determining, with the aid of said information, a ground rolling trajectory;
- a guidance system which comprises means for automatically determining, with the aid of at least certain of said measured current values and of said ground rolling trajectory, a yaw rate setpoint enabling the aircraft to follow said ground rolling trajectory; and
- a piloting aid system comprising means which use said yaw rate setpoint to aid the piloting of the aircraft.

Moreover, in an advantageous manner, said piloting aid system comprises:
- first control means which act on the yaw motion of the aircraft rolling on the ground;
- calculation means which calculate, automatically, commands able to be applied to said first control means, said commands being such that applied to said first control means the latter pilot the aircraft laterally according to said yaw rate setpoint so that it follows said ground rolling trajectory; and
- means which apply, automatically, the commands thus calculated to said first control means.

Furthermore, advantageously, said piloting aid system also comprises display means which present, on at least one viewing screen, first characteristic signs illustrating said yaw rate setpoint.

Additionally, in a preferred embodiment:
- said device comprises, moreover, means for entering constraints relating to the rolling of the aircraft on the airport domain;
- said navigation system comprises, moreover, means for automatically determining, with the aid of said entered constraints, a speed profile which is suited to said ground rolling trajectory, said speed profile being such that it provides a variation of the longitudinal speed while the aircraft is rolling along said trajectory;
- said guidance system comprises, moreover, means for automatically determining, with the aid of measured current values of the aircraft, of said trajectory and of said speed profile, a longitudinal speed setpoint which represents a longitudinal speed command enabling the aircraft to be made to roll on the ground along said trajectory while complying with said speed profile; and
- said piloting aid system comprises, moreover, means which use said yaw rate setpoint to aid the piloting of the aircraft and which comprise:
  - second control means which act on the speed of the aircraft;

calculation means which calculate, automatically, commands able to be applied to said second control means, said commands being such that applied to said second control means the latter pilot the aircraft longitudinally according to said longitudinal speed setpoint; and means which automatically apply the commands thus calculated to said second control means; and/or display means which present, on at least one viewing screen, second characteristic signs illustrating said longitudinal speed setpoint.

The device in accordance with the invention exhibits very many advantages. In particular, as specified further below:

it makes it possible to reduce the workload of the pilot in the course of the rolling phase, by handling all or some (depending on the operating mode) of the guidance of the aircraft on the ground, thereby allowing the pilot to concentrate on other tasks, in particular on monitoring the exterior environment (movements of the other vehicles, surrounding obstacles) and on communications with the air/ground traffic control;

it makes it possible to guarantee the position of the aircraft with respect to the axis of the runway, the trafficway, or any other element of the airport domain, and therefore:
to guarantee the guidance of aircraft whose relative length with respect to the dimensions of the trafficways may pose difficulties (namely the risk of wheels departing from the pavement), doing so without using any additional device intended to aid the pilot (exterior camera); and
to facilitate the circulation of the aircraft in visibility conditions which make it difficult to guide the aircraft, doing so without using exterior aids such as a vehicle to be followed;

it makes it possible to generate guidance commands aimed at improving the comfort of the passengers and crew (with respect to manual piloting), in particular in curves and turns, as well as when accelerating and braking;

it makes it possible to optimize the travel time between two points of the airport domain, and therefore to reduce the occupancy time of the runways, trafficways or any other element of the airport domain;

it makes it possible to predict, for example before the landing of the aircraft, the occupancy time of the runways, linkways or any other element of the airport domain, and therefore to allow the air/ground traffic control to anticipate any ground circulation problems and to adapt the airport scheduling accordingly;

it makes it possible to guarantee that the aircraft passes certain waypoints and at a given time, thereby allowing the air/ground traffic control to optimize the scheduling so as to keep the ground traffic flowing;

it allows airlines to improve the predictions of usage of the actuators, in particular of the engines (consumption during ground rolling) and of the brakes (estimation of the wear of the brakes), thereby affording advantages in terms of maintenance; and it makes it possible to optimize a compromise between the performance (in terms of trajectory travel time) and the wear of the actuators, as a function of the strategy adopted by the pilot or the airline.

The present invention also relates to an aircraft, in particular a civil or military transport airplane, which comprises a device such as the aforesaid.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
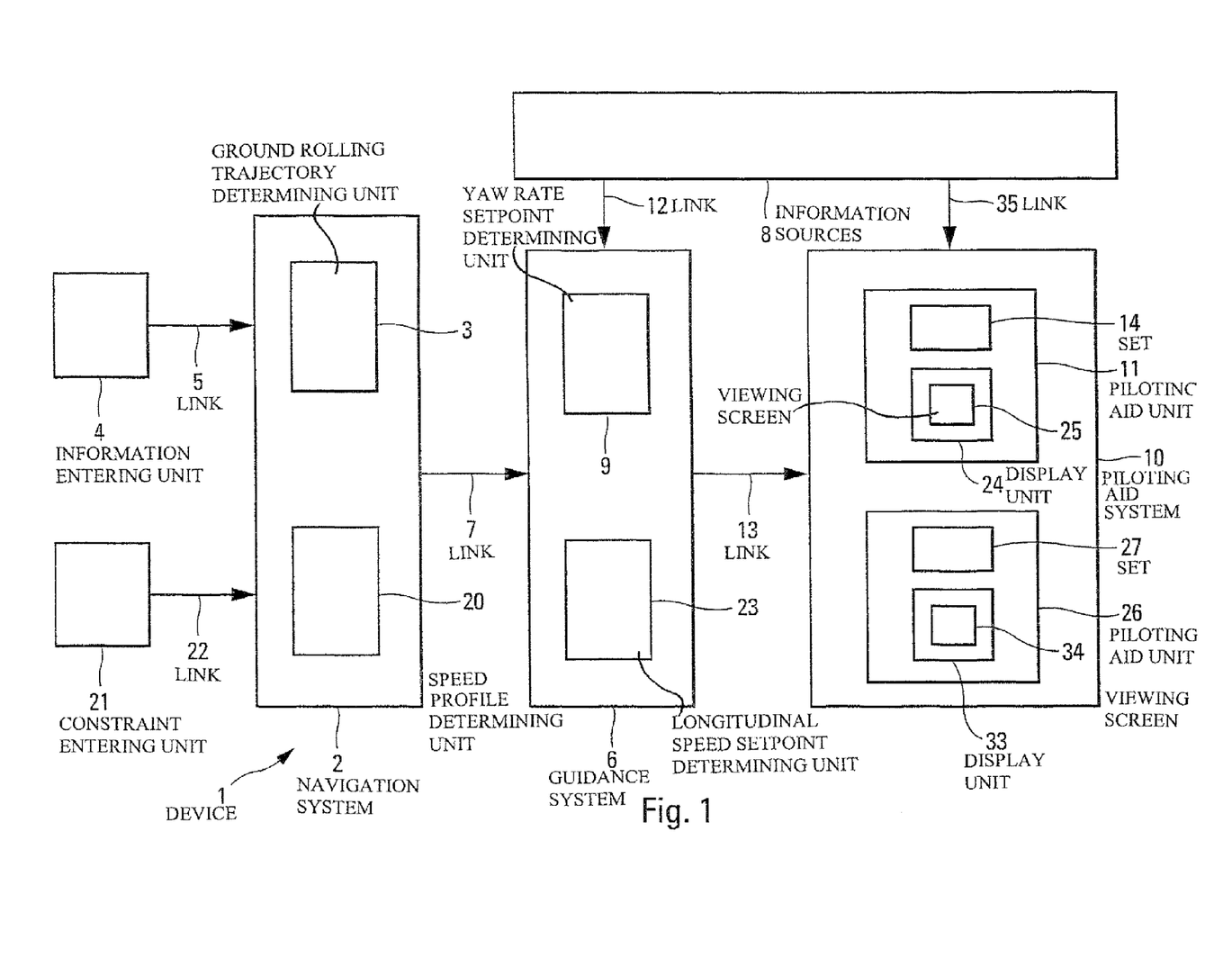
FIG. 1 is the schematic diagram of a device in accordance with the invention.

The device 1 in accordance with the invention and represented schematically in FIG. 1 is intended to carry out, in an at least partially automatic manner, the driving of an aircraft A rolling on the ground, on an airport domain such as an airport or an aerodrome.

According to the invention, said device 1 which is onboard the aircraft A comprises, as represented in FIG. 1:

a navigation system 2 which comprises means 3 for automatically determining a ground rolling trajectory TR, with the aid of information received by way of means 4 which are connected by a link 5 to said navigation system 2;

a guidance system 6 which is connected by way of a link 7 to said navigation system 2 and which comprises means 9 for determining automatically (on the basis of current values which have been measured with the aid of means forming part of a set 8 of information sources, which is connected by way of a link 12 to said guidance system 6, and on the basis of said ground rolling trajectory TR received from said navigation system 2), a yaw rate setpoint which enables the aircraft A to follow said ground rolling trajectory TR; and a piloting aid system 10 which comprises piloting aid means 11 which use said yaw setpoint (received by way of a link 13) to aid the piloting of the aircraft A. This system 10 is also connected by a link 35 to said set 8.

Thus, by virtue of the device 1 in accordance with the invention, at least one part of the driving of an aircraft A rolling on the ground is carried out in an automatic manner, namely in particular at least one part of the navigation function (implemented by the navigation system 2) consisting in automatically determining a ground rolling trajectory TR, as well as at least one part of the guidance function (implemented by the guidance system 6) consisting in automatically determining a yaw rate setpoint enabling the aircraft A to follow this ground rolling trajectory TR.

The set of operations implemented by the device 1 are designated hereinafter by the expression "automatic driving function".

Furthermore, the expression ground (rolling) trajectory TR is understood to mean the pathway followed by the aircraft A on an airport domain such as an airport or an aerodrome, including in particular the takeoff and landing runways, the trafficways or taxiways, the turn-around areas, the waiting zones, the stop bars, the stopping positions (stand), the maneuvering areas, and the parking areas.

It is assumed that the trajectory TR to be followed is a continuous line connecting two points of the airport domain, and can be described in mathematical form, for example in the form of a succession of straight segments, circular or elliptic arcs, clothoids, NURBSs, splines (in particular Bezier curves), or a combination of the above curves, or any other possible description of a curve.

Figure 2:
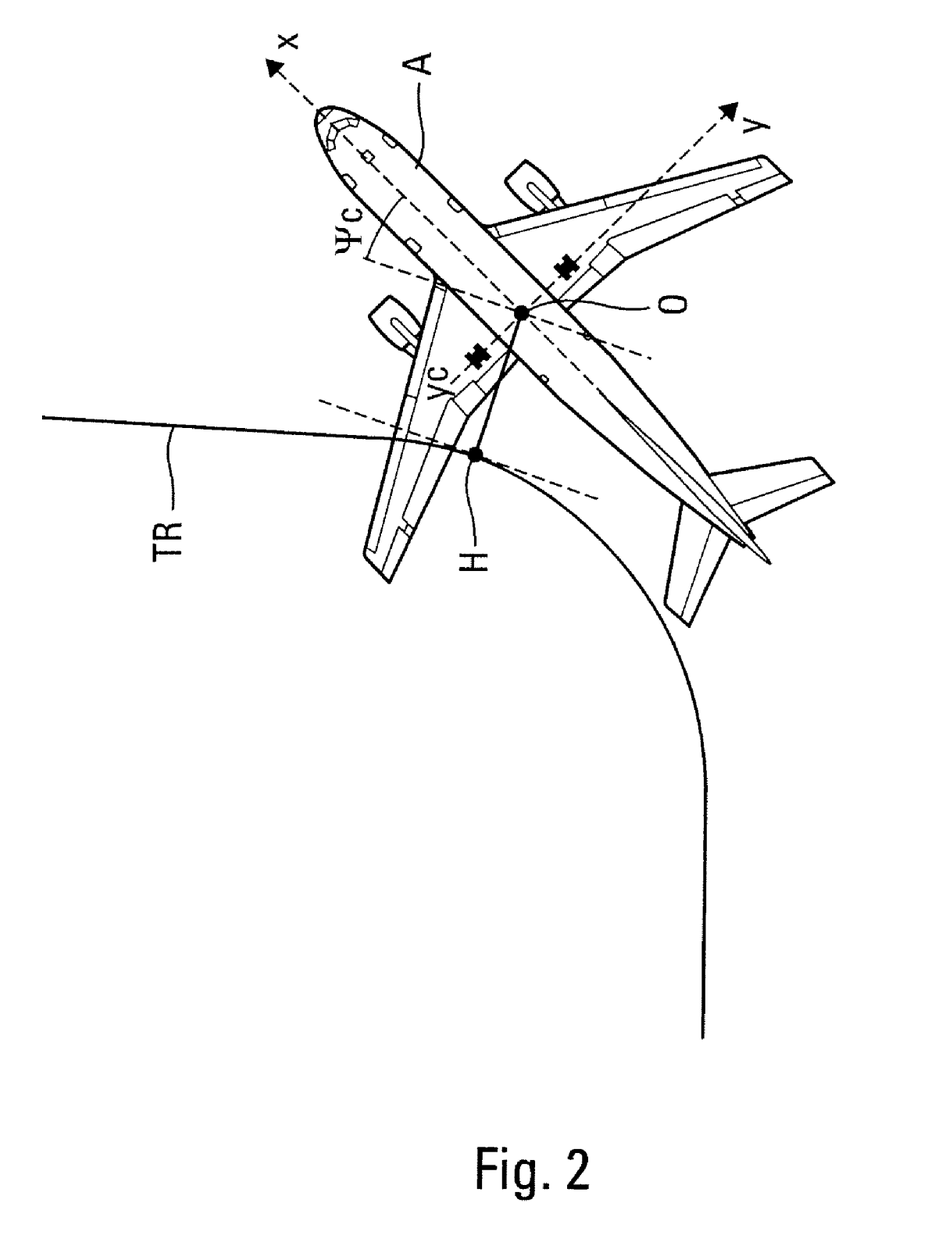
FIG. 2 schematically illustrates, in plan view, the rolling on the ground of an aircraft along a trajectory.

In FIG. 2 an aircraft A is represented which rolls on the ground along a trajectory TR. FIG. 2 also represents:
- a current target point H of the trajectory TR;
- a lateral deviation yc between the current target point H and a point O which is a control point of the aircraft A that has to be slaved to the trajectory TR;
- a current angular deviation ψc between the current heading of the aircraft A and the angle defined by the tangent of the trajectory at H; and
- a horizontal plane Oxy.

Additionally, said means 4 can comprise:
- input means, in particular a keyboard, allowing an operator, in particular the pilot of the aircraft A, to input characteristics of the trajectory TR into the device 1; and/or
- reception means making it possible to receive automatically and directly from outside the aircraft A, in particular from a post intended for air traffic control or for ground control, in particular with the aid of a digital data transmission link (not represented), information making it possible to characterize said trajectory TR.

In a preferred embodiment, said means 3 comprise the following means (not represented) which are integrated:
- means for receiving from said means 4 a path comprising a series of elements of the airport domain that the aircraft A must follow successively, an element representing a distinct and delimited portion of the airport domain and being characterized by at least two reference points which represent fixed points of said airport domain;
- means for automatically extracting from a set of reference points of the airport domain the geographical coordinates of the reference points corresponding to the elements of said path that the aircraft A must follow;
- means for automatically transposing the geographical coordinates thus extracted, into a metric frame tied to the airport domain;
- means for automatically determining, on the basis of said coordinates thus transposed, the set of points of intersection of the successive elements of said path which are such that, when they are connected together successively, they form an auxiliary trajectory; and
- means for automatically shaping said auxiliary trajectory, at least by determining a turn at each of said intersection points, so as to generate said trajectory TR intended for the ground rolling of the aircraft A.

Moreover, said means 3 can comprise:
- means for verifying, for each intersection point, that the angle formed by two segments arriving at this intersection point is less than a predetermined threshold value, so as to avoid constructing overly short turns or turn-back points; and/or
- means for eliminating all the artifacts existing on the auxiliary trajectory. Within the framework of the present invention, an artifact is an anomaly appearing during the construction of a turn, when two intersection points are too close to leave room for two turns separated by a segment. The consequence of this anomaly is the appearance of two turn-back points at the level of the segment situated between these turns; and/or
- means for carrying out, if appropriate, a concatenation of the segments of said auxiliary trajectory. If, in the auxiliary trajectory, several successive elements are straight segments, these straight segments are aligned (otherwise they would be separated by turns). In this case, it is possible to simplify the trajectory, by concatenating these successive straight segments into a single straight segment.

Furthermore, preferably, the means 3 provide said trajectory TR in the form of an array which lists the successive elements of the trajectory TR, and which presents, for each of these elements:
- a first characteristic sign (comprising for example a number or its coordinates) which makes it possible to define its position in the trajectory;
- a second characteristic sign making it possible to characterize it, for example by indicating its type such as aforesaid;
- its length; and
- its maximum curvature.

Such a presentation of the trajectory TR makes it possible to render it more consistent and more easily operable by user systems, and in particular by the guidance system 6.

Additionally, in a preferred embodiment, said means 9 comprise the following integrated means (not represented):
- means for receiving said trajectory TR;
- first means for determining, on the basis of said trajectory TR and of the measured current position of the aircraft A (received from said set 8), a current curvature at a current target point H of the trajectory TR;
- second means for determining, on the basis of said trajectory TR and of said measured current position, a current lateral deviation yc;
- third means for determining, on the basis of said trajectory and of said measured current heading, a current angular deviation ψc; and
- means for calculating, on the basis of measured current lateral and longitudinal speeds of the aircraft A, as well as on the basis of said current curvature, of said current lateral deviation yc and of said current angular deviation ψc, a yaw rate which represents said yaw rate command enabling the aircraft A to follow said trajectory.

Thus, by virtue of said means 9, a yaw rate command is obtained on the basis of a predefined trajectory TR, and which is a global command so that applied to the aircraft A as a whole, it makes it possible to exert a rotation moment of the aircraft A about the vertical axis, so as to be able to slave a point of said aircraft A (for example the wheel of the front gear, the center of gravity of the aircraft A, or the middle point of the main points) along the trajectory TR. Stated otherwise, it enables the projection of this point on the ground to be maintained on said trajectory TR, to within an error margin.

In a particular embodiment, said first aforesaid means of said means 9 comprise elements:
- for determining, on the basis of said trajectory TR and of the measured current position of the aircraft A (received from said set 8), a current element of said trajectory TR comprising a series of successive elements;
- for determining on this current element a current target point H, by taking account of a control point O of the aircraft A and of said current position; and
- for determining the curvature of said current element at said current target point H so as to obtain said current curvature.

Furthermore, as represented in FIG. 2:
- said second aforesaid means of said means 9 determine said current lateral deviation yc as the distance between a control point O of the aircraft A (that one seeks to slave to the trajectory TR) and the current target point H of the trajectory TR; and/or
- said third aforesaid means of said means 9 determine said current angular deviation ψc as the angular deviation between the current heading of the aircraft A and the tangent to the trajectory at the level of the current target point H.

Figure 3:
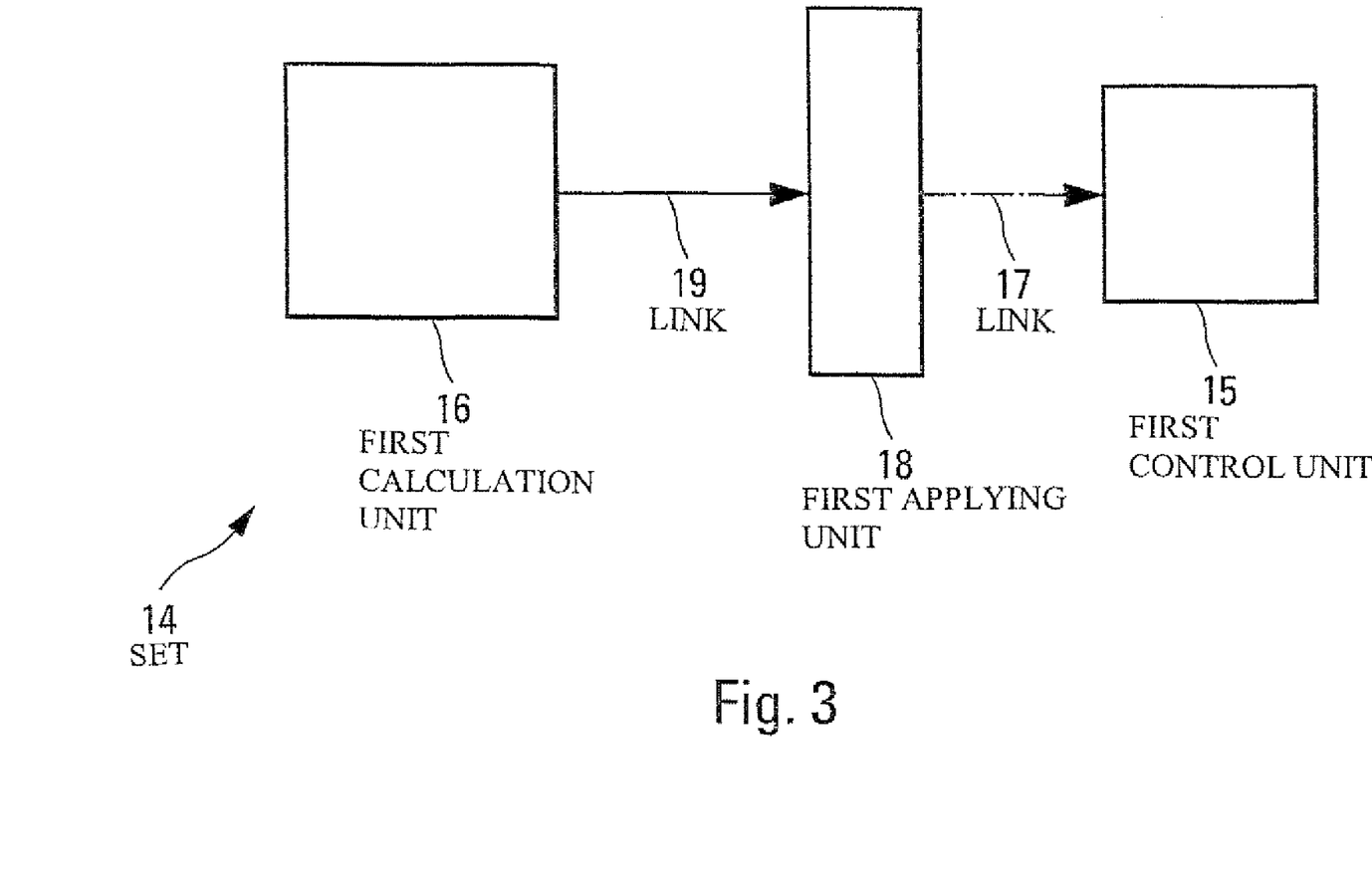
FIGS. 3 and 5 schematically represent means for aiding piloting which form part of a device in accordance with the invention.

In a particular embodiment, said means 11 for aiding piloting comprise a set 14 which comprises, as represented in FIG. 3:

- control means 15 which act on the yaw motion of the aircraft A. These means 15 can comprise, in particular, the wheel of the front landing gear of the aircraft A, standard means for controlling the thrust of the engines, the brakes of the aircraft A, and/or a rudder;
- means 16 which are intended to calculate setpoints able to be applied to said control means 15. These setpoints are such that applied to said control means 15, the latter control the aircraft A according to the yaw rate command received from said guidance system 6; and
- standard means 18, for example actuators of the rudder, which are connected by way of a link 19 to said means 16 and which are formed so as to apply, in a standard manner, the setpoints calculated by said means 16 to said control means 15, as illustrated by a chain-dotted link 17.

The latter embodiment therefore carries out the piloting of the aircraft A along the ground rolling trajectory TR in an automatic manner. Consequently, in this embodiment, the whole of the lateral driving of the aircraft A (intended to enable it to follow the trajectory TR) is carried out in an automatic manner, since so also are the processings implemented by the means 3 and 9, thereby making it possible in particular to reduce the workload of the pilot during the ground rolling phase.

Furthermore, said means 11 for aiding piloting can also comprise display means 24, in particular a ground director (which, within the framework of the present invention, carries out, on the ground, functions equivalent to those carried out by a standard flight director in flight), which presents, on at least one standard viewing screen 25, first characteristic signs illustrating said yaw rate setpoint. In this case, the piloting of the aircraft A along the ground rolling trajectory TR can be carried out automatically or manually, depending on whether it is or is not implemented simultaneously with the aforesaid embodiment (relating to the set 14). When the piloting is carried out manually, its implementation is facilitated by virtue of the display carried out by said display means 24. This embodiment therefore relates to a lateral driving that is semi-automatic since only the navigation and guidance functions are automatic, whereas the piloting function is carried out manually, but with valuable aid provided by said display means 24.

Furthermore, in a preferred embodiment:

- said navigation system 2 comprises, moreover, means 20 for determining automatically (on the basis of constraints relating to the rolling of the aircraft A on the airport domain, which are received by way of means 21 which are connected by way of a link 22 to said navigation system 2), a speed profile PV which is such that it provides a variation of the longitudinal speed while the aircraft A is rolling along said trajectory TR;
- said guidance system 6 comprises, moreover, means 23 for automatically determining, with the aid of current values (measured by means forming part of said set 8), of said trajectory TR determined by said means 3 and of said speed profile PV determined by said means 20, a longitudinal speed setpoint which represents a longitudinal speed command enabling the aircraft A to be made to roll on the ground along said trajectory TR while complying with said speed profile PV; and
- said piloting aid system 10 comprises piloting aid means 26 which use said yaw rate setpoint to aid the longitudinal piloting of the aircraft A.

By virtue of this preferred embodiment, longitudinal driving of the aircraft A, which is at least partially automatic, is therefore obtained.

Figure 4:
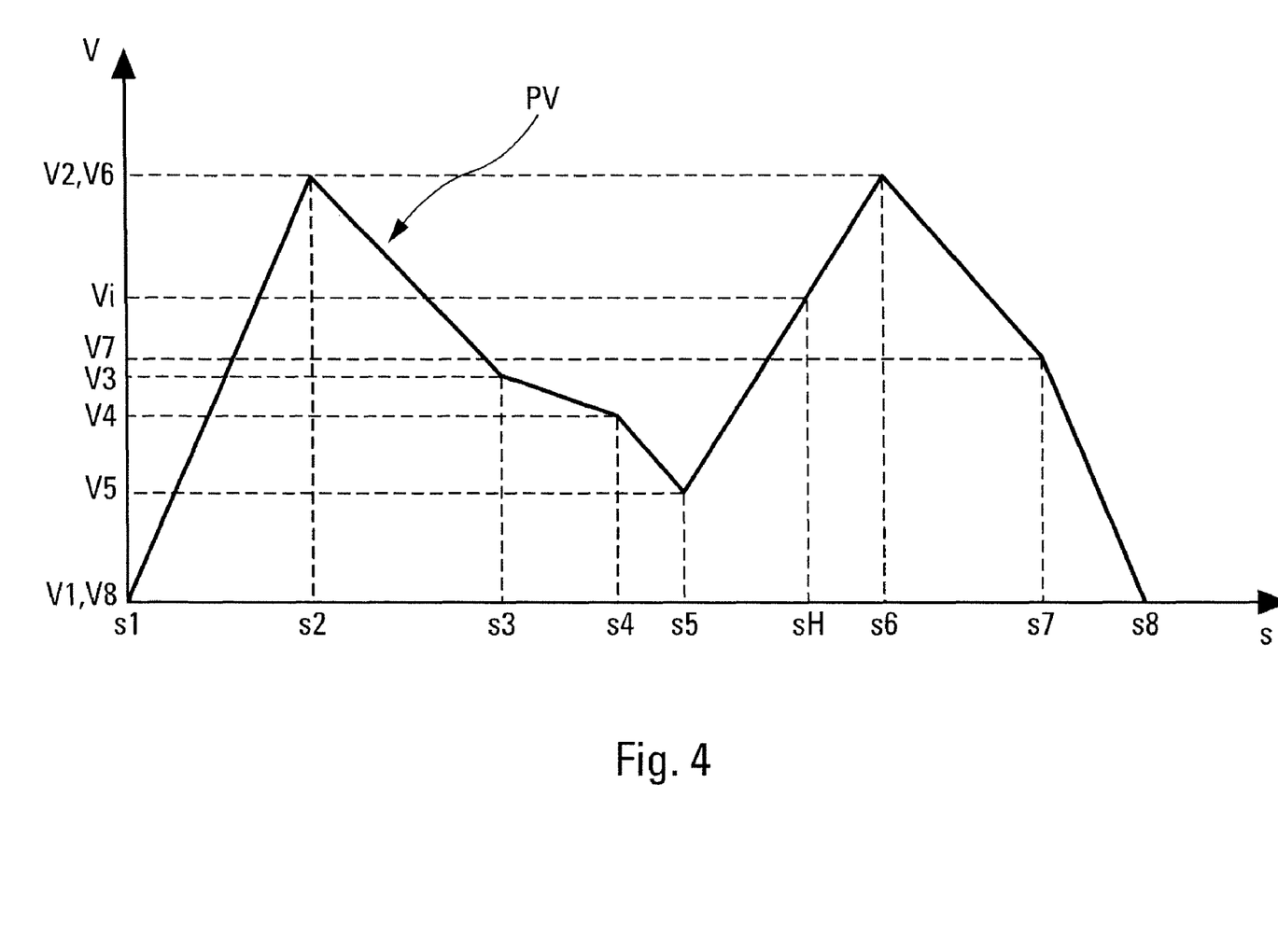
FIG. 4 is a graphic illustrating a speed profile.

Within the framework of the present invention, the expression speed profile PV which is associated with a trajectory TR (for rolling on the ground), is understood to mean a set of values of the speed V corresponding either to a set of positions (expressed for example in the form of curvilinear abscissae s) along this trajectory, as represented in FIG. 4, or to a set of time values. These two sets (speeds/positions or speeds/times) possess the same number of elements (s1 to s8 and V1 to V8) so that, in the example of FIG. 4, with a position s1 is associated a speed V1, with a position s2 is associated a speed V2, etc., and with a position s8 is associated a speed V8. Also represented in FIG. 4 is a current position sH with the corresponding speed Vi such as defined by said speed profile PV.

Additionally, said means 21 can comprise input means, comprising for example a keyboard, which make it possible to input the constraints relating to the rolling of the aircraft A on the airport domain.

In a particular embodiment, said means 20 comprise the following integrated means (not represented):

- means for receiving (from said means 21) first constraints (regulatory speed, load factor, etc.) relating to the rolling of the aircraft A on the airport domain;
- first means for automatically determining for each of the elements of the trajectory TR, an associated maximum speed, by taking account of said first constraints;
- means for receiving (from said means 21) second constraints [time constraint, constraints on load factor and jerk (derived from the acceleration), etc.] relating to the rolling of the aircraft A on the airport domain; and
- second means for automatically determining, by taking account of said maximum speeds and of said second constraints, a speed profile PV which is suited to each element of the trajectory TR and which complies with the set of maximum speeds and second constraints.

In a particular embodiment, said first aforesaid means of the means 20 determine, as maximum speed for an arbitrary element of the trajectory TR, the speed which is a minimum from among at least said following speeds:

- an admissible maximum speed while turning so as to ensure the comfort of the passengers of the aircraft A;
- a maximum yaw rate that can be supported by the aircraft A;
- a regulatory speed in a straight line;
- a regulatory speed while turning;
- a maximum speed complying with admissible load limits on the various landing gear of the aircraft A; and
- a maximum speed dependent on the grip of the tires of the aircraft A.

Additionally, in a particular embodiment, for each element of the trajectory TR, said second aforesaid means of said means 20 comprise elements for:

- determining switching times;
- calculating particular variations in speed between the various successive switching times; and
- constructing the speed profile PV corresponding to this trajectory element, by taking account of said variations in speed and of said switching times.

Furthermore, said second means (of said means 20):

- can take into account, in the absence of a time constraint, a cost index to determine said speed profile PV, said cost index effecting a compromise between a maximum speed on each element of the trajectory TR and a limitation of the (untimely) use of the engines and brakes of the aircraft A; or can take into account, to determine said speed profile PV, at least one time constraint. Within the framework of the present invention, the expression time constraint is understood to mean a time at which to pass a given point (or waypoint) that the aircraft A must comply with during its journey along the ground trajectory TR. Said second means can also take into account the response time of engines of the aircraft A, following a speed control, to determine said speed profile PV.

In a particular embodiment, said means 23 comprise the following integrated means (not represented):
  means for automatically calculating, on the basis of said trajectory TR, of said speed profile PV and of the current position of the aircraft A, an interpolated speed Vi which represents a speed value of the speed profile PV corresponding to the current position of a control point O of the aircraft A;
  means for automatically determining a weighting factor; and
  means for automatically determining, on the basis of said interpolated speed Vi, an auxiliary speed which is multiplied by said weighting factor so as to obtain a controlled speed Vc (which represents a longitudinal speed command enabling the aircraft A to be made to roll on the ground along said trajectory TR while complying with said speed profile PV).

Figure 5:
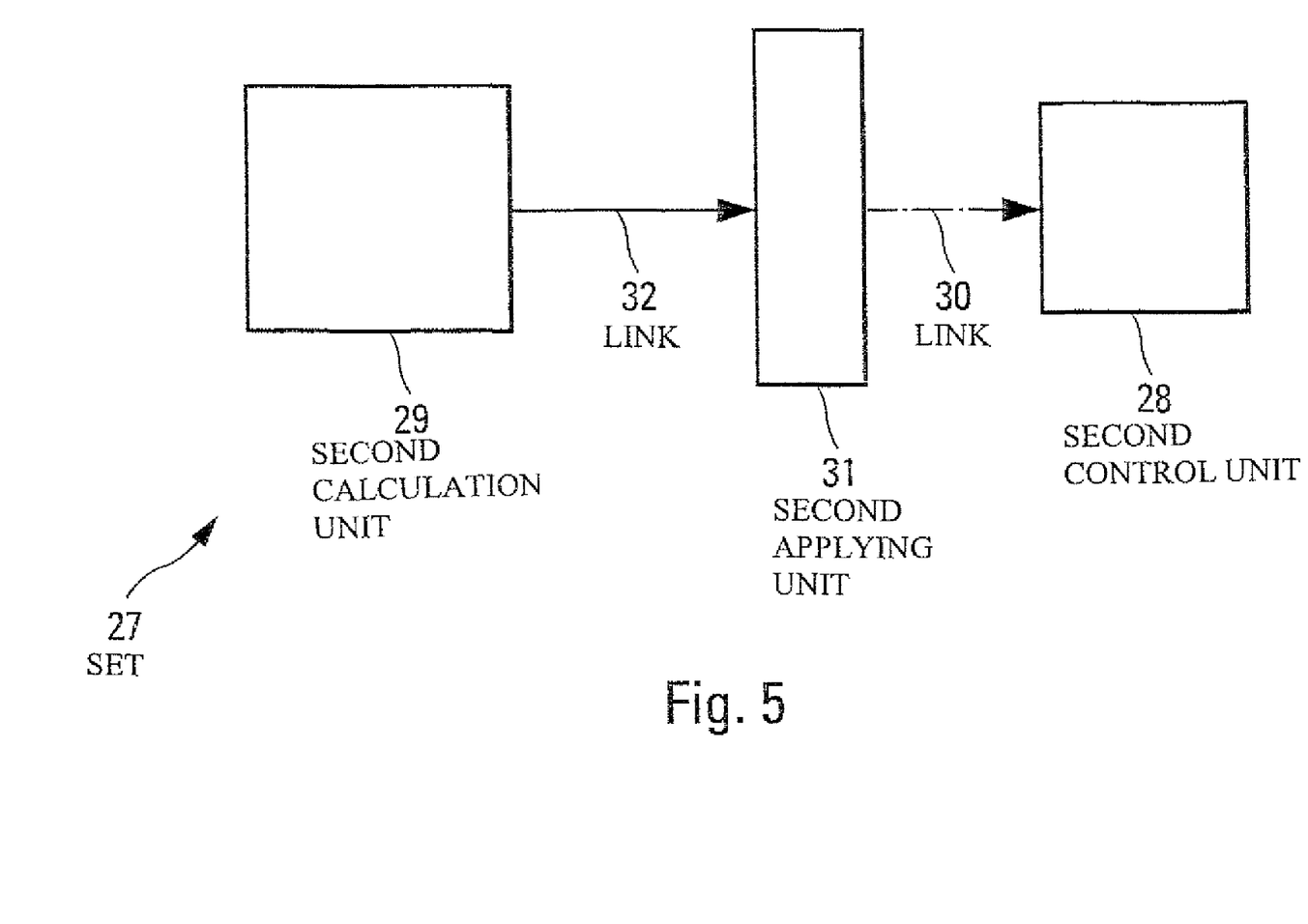

In a particular embodiment, said means 26 for aiding piloting comprise a set 27 which comprises, as represented in FIG. 5:
  control means 28, for example means specific to the aircraft A such as engines and/or brakes or means external to the aircraft, which act on the (longitudinal) speed of the aircraft A;
  means 29 which are intended to calculate setpoints able to be applied to said control means 28. These setpoints are such that applied to said control means 28, the latter control the aircraft A according to said controlled speed Vc received from said means 23; and
  standard means 31, for example means specific to the aircraft A such as actuators of the engines or brakes or means external to the aircraft, which are connected by way of a link 32 to said means 29 and which are formed so as to apply, in a standard manner, the setpoints calculated by said means 29 to said control means 38, as illustrated by a chain-dotted link 30.

Furthermore, said means 26 for aiding piloting can comprise display means 33, for example a ground director (which, within the framework of the present invention, carries out, on the ground, functions equivalent to those carried out by a standard flight director in flight), which present, on a viewing screen 34, second characteristic signs which illustrate said longitudinal speed setpoint (the controlled speed Vc). The screen 34 can correspond to the screen 25 of the display means 24.

Additionally in a particular embodiment, said device 1 comprises, moreover, integrated means (not represented) for avoiding an excessive deviation. These means comprise in particular:
  an element for determining the following deviations of the aircraft A with respect to said ground rolling trajectory TR: a lateral deviation yc and an angular deviation ψc;
  an element for comparing these deviations with predetermined corresponding limit values; and
  an element for implementing at least one first protection function intended to aid the elimination of this overshoot, if one of these deviations overshoots the corresponding limit value.

Furthermore, in a particular embodiment, said device 1 also comprises integrated means (not represented) for avoiding an excessive speed. These means comprise in particular:
  an element for determining a speed deviation between the measured current speed of the aircraft A and a speed prescribed by said speed profile PV;
  an element for comparing this deviation with a predetermined corresponding limit value; and
  an element for implementing at least one second protection function intended to aid the elimination of this overshoot, if this deviation overshoots said corresponding limit value.

Additionally, in a particular embodiment, said device 1 also comprises integrated means (not represented) for detecting a position inconsistency. These means comprise in particular:
  an element for verifying whether the current position of the aircraft A, received from the set 8, is consistent in relation to the ground rolling trajectory TR; and
  an element for implementing at least one third protection function intended to aid the elimination of this inconsistency, if said current position is not consistent.

Furthermore, in a particular embodiment, said device 1 also comprises means (not represented) for determining a ground protection envelope and using this ground protection envelope to modulate a speed command.

In a preferred embodiment of the present invention, the sequencing of the operations performed by the pilot and/or the device 1 is as follows:
  to begin with, the device 1 is provided with a path with the aid of the means 4. This operation can be performed:
    manually by the pilot (in particular if the path is provided by the air/ground traffic control by radiocommunication), by virtue of a means (forming part of said means 4) making it possible to input computer data, for example a keyboard, a mouse, a mouse wheel, etc.; or
    automatically, in particular by a means of communication between the air/ground traffic control and the aircraft A (for example an analog or digital means such as a digital data transmission link), in which case the pilot has the choice between:
      accepting as is the path proposed by the air/ground traffic control. In this case, he merely needs to validate this path (with the aid of an appropriate means which forms for example part of the means 4) to go to the next step;
      refusing the proposed path, in which case he can manually change same, totally or in part.
  In both cases, the device 1 verifies that the path entered (with the aid of the means 4) is valid before going to the next step. If the path is valid, it is for example demarcated on a display means of the aircraft, for example on one of the viewing screens 25 and 34;
  the second step consists in providing the device 1 with a set of constraints (time constraints) with the aid of the means 21. This operation can be performed:
    manually by the pilot (in particular if the time constraints are provided by the air/ground traffic control by radiocommunication), by virtue of a means (forming part of the means 21) making it possible to input computer data, for example a keyboard, a mouse, a mouse wheel, etc.; or
    automatically, in particular by a means of communication between the air/ground traffic control and the aircraft A (for example an analog or digital means, such as a digital data transmission link), in which case the pilot has the choice between:

accepting as are the time constraints proposed by the air/ground traffic control. In this case, he merely needs to validate this set of time constraints (with the aid of an appropriate means which forms for example part of the means 21) to go to the next step; refusing the proposed time constraints, in which case he can manually change same, totally or in part.

In both cases, the device 1 verifies that the time constraints entered are valid and consistent with the trajectory TR selected at the previous step before going to the next step.

If the air/ground traffic control does not provide any time constraint, the pilot can then choose to input a global cost index associated with the whole of the trajectory TR, and making it possible to effect a compromise between the performance (in terms of path travel time) and the wear of the actuators, as a function of the strategy adopted by the pilot or the airline;

the third step consists in arming the device 1, through an appropriate interface (one or more button(s) for example), so that the guidance function (of the guidance system 6) is ready to determine the commands to be dispatched to the piloting function (of the system 10). The device 1 then displays a message, on a display means of the aircraft A, for example on one of the screens 25 and 34, indicating to the pilot that the device 1 is armed; and the fourth step consists in activating the device 1. This activation is performed if certain conditions (in particular regarding position, speed and orientation of the aircraft A) are fulfilled. Once the device 1 has been activated, the navigation, guidance and piloting aid functions calculate their respective controls, so that the aircraft A follows the requested trajectory TR, preferably while complying with the speed profile PV satisfying a cost index or a set of time constraints.

In a preferred embodiment of the device 1, three types (A, B, C) of operating modes are distinguished:

A/ a series of modes termed "normal", that is to say available during nominal operational conditions. It is possible to go from one normal mode to another, in particular through an action on the piloting facilities of the aircraft A (for example the engine thrust levers, the brake pedals, the directional rudder bar, the steering wheel for controlling the orientation of the wheels of the front gear), or through an appropriate interface (for example a button). Five normal modes are distinguished:

a mode termed "Direct Manual", in which the aircraft A is controlled manually by the pilot, in a standard manner;

a mode termed "Normal Manual", in which the aircraft A is controlled manually by objectives (relating to direction and/or to speed/acceleration);

a fully automatic mode, termed "Full-Auto" ("Managed Full-Auto": "M/FA" mode), in which the device 1 makes it possible to control the aircraft A without aid from the pilot along the chosen trajectory TR and according to a speed profile PV ensuing from the cost index or time constraints chosen. In this mode, the pilot does not need to actuate a piloting facility in order to steer the aircraft A, thereby enabling him to concentrate on other tasks, such as monitoring the exterior environment. The pilot can also be afforded, on one of the display means 24 and 33 of the aircraft A, a visual aid provided by a ground director, representing for example the ground guidance objectives;

a semiautomatic mode, termed "Auto-Lateral" ("M/AL" mode), in which the device 1 makes it possible to control the aircraft A according to the lateral axis, that is to say it makes it possible to guide the aircraft A along the trajectory TR. On the other hand, the speed of the aircraft A is controlled manually by the pilot, as in the normal manual mode. The pilot can rely on the ground director (display means 33) to follow the speed profile PV that would be followed by the device 1 in M/FA mode. Additionally, the speed of the aircraft A is limited by the device 1 so as to permanently comply with certain speed constraints, related in particular to the form of the trajectory, to the airport regulations, to the state of the runway, to passenger comfort criteria or to criteria specific to the aircraft A (loads on the various landing gear, grip and state of the tires), so that the pilot can control the longitudinal speed only in a speed range limited by the device 1; and an assisted manual mode, termed "Visual Help" ("MNH" mode), in which the aircraft A is controlled manually by the pilot (as in the normal manual mode), but in which the pilot can rely on the ground director (display means 24 and 33) to follow at one and the same time the requested trajectory TR and the corresponding speed profile PV. Additionally, the speed of the aircraft A is limited by the device 1 so as to permanently comply with certain speed constraints, related in particular to the form of the trajectory TR, to the airport regulations, to the state of the runway, to passenger comfort criteria or to criteria specific to the aircraft A (loads on the various landing gear, grip and state of the tires), so that the pilot can control the longitudinal speed only in a speed range limited by the device 1;

B/ a series of auxiliary modes, which correspond to non-nominal operational situations:

a mode termed "Excessive Deviation" ("Excessive Deviation Mode"), corresponding to a situation where the lateral deviation yc and/or the angular deviation $\psi c$ of the aircraft A in relation to the trajectory TR overshoot given limits. In this case:

in a first embodiment, the controlled speed of the aircraft A is reduced to zero, and manual control of the aircraft A is disabled until the aircraft A stops completely. In a second embodiment (preferred):

the device 1 reverts to normal manual control mode if it was previously in automatic or semiautomatic mode; and an optional alert message appears on a display means of the aircraft A to advise the pilot that the mode of control has changed;

a an alert message appears on a display means of the aircraft A to advise the pilot that the operating conditions of the aircraft A are no longer nominal.

When the pilot succeeds in returning the aircraft A to a nominal situation (in terms of lateral and angular deviations), he can then change mode, for example to revert to automatic or semiautomatic mode;

a mode termed "Excessive Speed" ("Excessive Speed Mode"), corresponding to a situation where the speed of the aircraft A in relation to the speed profile PV overshoots given limits. In this case:

in a first embodiment, the controlled speed of the aircraft A is reduced to zero, and manual control of the aircraft A is disabled until the aircraft A stops completely. In a second embodiment (preferred):

the device 1 reverts to normal manual control mode if it was previously in automatic or semiautomatic mode; and an optional alert message appears on a display means of the aircraft A to advise the pilot that the mode of control has changed;

an alert message appears on a display means of the aircraft A to advise the pilot that the operating conditions of the aircraft A are no longer nominal.

When the pilot succeeds in returning the aircraft A to a nominal situation (in terms of speed), he can then change mode, for example to revert to automatic or semiautomatic mode; and a mode termed "wrong Taxiway" ("Taxiway Disagree Mode"), corresponding to a situation where the position of the aircraft A is not consistent in relation to the envisaged trajectory TR, in particular if the aircraft A has entered a runway, a trafficway, or any other element, which does not correspond to the element envisaged by the trajectory TR. In this case:

in a first embodiment, the controlled speed of the aircraft A is reduced to zero, and manual control of the aircraft A is disabled until the aircraft A stops completely. In a second embodiment (preferred):

the device 1 reverts to normal manual control mode if it was previously in automatic or semiautomatic mode; and an optional alert message appears on a display means of the aircraft A to advise the pilot that the mode of control has changed;

an alert message appears on a display means of the aircraft A to advise the pilot that the operating conditions of the aircraft A are no longer nominal.

When the pilot succeeds in returning the aircraft A to a nominal situation (in terms of trajectory), he can then change mode, for example to revert to automatic or semiautomatic mode.

For these three unusual modes, the device 1 goes to "Visual Help" mode until a change of mode carried out manually by the pilot; and C/ a mode termed "fault mode", corresponding to a situation where the automatic driving function is no longer able to provide guidance setpoints (for example in the event of a computer fault, or in the event of information being unavailable). In this case, the aircraft A can be piloted in "Direct Manual" mode.

The detailed sequencing of the operations that are performed by the device 1 in accordance with the aforesaid preferred embodiment (which comprises four steps, as indicated above), is described hereinafter.

The first step of the sequencing consists in choosing the mode of selecting the route: manual or automatic.

In the event of manual selection of the route, the pilot must manually enter the elements of the airport to be traversed successively, with the aid of a means (forming part of the means 4) making it possible to input computer data, for example a keyboard, a mouse, a mouse wheel, etc.

For each element thus selected, the device 1 takes charge of downloading the characteristics of the element, in particular the geographical coordinates (latitude and longitude) as well as the type of the element. The coordinates are thereafter transformed into a metric frame local to the airport.

The device 1 then verifies that the element which has just been selected is indeed consistent with the previously selected elements (if there are any), in particular that the selected element is indeed adjacent to the previous one, that it does not form any turn-back point, that the aircraft A is authorized to roll on this element and that the ACN/PCN compatibility is satisfied.

If these conditions are not satisfied, the device 1 displays a message (on one of the display means 24 and 33 for example) indicating that the selected trajectory element is not valid and inviting the pilot to choose another one. In this case, we return to the step of selecting the route.

If the previous conditions are satisfied, the device 1 displays the selected element, and it updates the display of the previous elements (if there are any) so as to display a continuous path. The device 1 then invites the pilot to verify visually that the selected element and the display are consistent.

If there is inconsistency, or if the pilot has made a mistake in his selection (input error or choice modified as an afterthought), he does not validate the selected element. The device 1 then displays a message indicating that a selection error has occurred and invites the pilot to select another element. The pilot can also, in the case of an inconsistency between the display and his selection, decide to report (immediately or otherwise) to the air/ground traffic control termed "ATC" hereinafter ("Air Traffic Control") or to another authority, the invalidity of the database containing the trajectory elements of the airport.

If there is no inconsistency, the device 1 stores the trajectory element (that is to say its coordinates expressed in the metric frame local to the airport, as well as its type) following the previously selected elements, and asks the pilot whether he has terminated selection of the trajectory.

If selection is not finished, the pilot is invited to continue his selection by repeating the previous manipulations.

If selection is finished, the means 3 of the device 1 carry out the generation of the trajectory TR.

Furthermore, in the event of automatic selection of the route, if a path proposed by the ATC is available, it can be downloaded automatically.

The device 1 then takes charge of downloading the characteristics of the set of elements of the path, in particular the geographical coordinates (latitude and longitude) as well as the type of each element. The coordinates are thereafter transformed into a metric frame local to the airport.

The device 1 then verifies that the elements which have just been selected are indeed consistent with one another, in particular that they are indeed adjacent, that they do not form any turn-back points, that the aircraft A is authorized to roll on these elements and that the ACN/PCN compatibility is satisfied.

If these conditions are not satisfied, the device 1 displays a message (on one of its display means 24 and 33 in particular) indicating that the selected trajectory is not valid and inviting the pilot to choose another one. In this case, the device 1 proposes to the pilot that he continue selection of the path, but now in manual mode. The pilot can accept (in which case the manual selection operations are those described above) or not (in which case the trajectory selection procedure stops there and the automatic driving function cannot be activated). In both cases, the pilot can then decide to report (immediately or otherwise) to the ATC, or to another authority, the invalidity of the database containing the trajectory elements of the airport, the lack of ACN/PCN consistency of the proposal from the ATC, etc. The pilot then asks the ATC for a new proposal.

If the previous conditions are satisfied, the device 1 displays the path on a display means, and asks the pilot to verify that he is happy with the path displayed and that it is consistent with the path provided by the ATC.

If there is inconsistency, he does not validate the selected path. The device 1 then displays a message indicating that a selection error has occurred, and invites the pilot to select a path manually.

If there is no inconsistency, the device 1 stores the set of elements of the selected path (that is to say their coordinates expressed in the metric frame local to the airport, as well as their type), and undertakes the generation of the trajectory TR. In a future upgrade, it will be possible for this agreement to be transmitted to the ATC which will then be able to take this acceptance into account and thus indicate it on its own means.

On the basis of the path stored in the form of a succession of elements, the device 1 generates (with the aid of the means 3) a trajectory TR, described in mathematical form.

The device 1 then displays the complete trajectory TR (by updating the previous display if need be), as well as certain information relating to the trajectory TR, in particular the total length of the trajectory TR, as well as the lengths separating the various waypoints. The device 1 also asks the pilot to verify and validate this trajectory TR.

If the pilot does not validate the trajectory TR, the device 1 displays a message indicating that the pilot is not in agreement with the proposed trajectory and invites him to reselect another path (return to the starting point).

If the pilot validates the trajectory TR, the latter is stored and ready to serve for the following steps. In particular, the trajectory TR serves to calculate a set of speed constraints associated therewith, as well as an envelope of admissible maximum speeds on the various elements of the trajectory, with a view to generating the speed profile PV.

The second step of the sequencing consists in selecting a mode of time constraints associated with the previous trajectory: manual, automatic, or cost index.

During manual selection of the time constraints, the pilot must manually enter the successive time constraints, with the aid preferably of the means 21 making it possible to input computer data, for example a keyboard, a mouse, a mouse wheel, etc.

For each constraint thus selected, the device 1 verifies that the time constraint is consistent with the envelope of admissible maximum speeds, as well as with the trajectory TR previously selected, and in particular that:
- the constraint is associated with a point of the trajectory TR; and
- the aircraft A can meet the time constraint, that is to say reach the waypoint associated with this constraint in the time allowed, while complying with the speed limits given by the envelope of admissible maximum speeds.

If there is inconsistency, the device 1 displays a message (on one of its display means 24 and 33 for example) indicating that the selected time constraint is not valid and inviting the pilot to choose another one. In this case, we return to the step of selecting the time constraint.

If there is no inconsistency, the device 1 displays the selected constraint, updates the display, then invites the pilot to verify visually that the selected time constraint and the display are consistent.

If there is inconsistency between the selection and the display, or if the pilot has made a mistake in his selection (input error or choice modified as an afterthought), he does not validate the selected time constraint. The device 1 then displays a message indicating that a selection error has occurred and invites the pilot to select another constraint.

If there is no inconsistency between the selection and the display, the device 1 stores the time constraint following the previously selected constraints, and asks the pilot whether he has terminated the selection.

If selection is not finished, the pilot is invited to continue his selection by repeating the previous manipulations.

If selection is finished, the device 1 carries out (with the aid of the means 20) the generation of the speed profile PV.

Additionally, during automatic selection of the time constraints, if a set of time constraints proposed by the ATC is available, it can be downloaded automatically.

The device 1 then verifies that the constraints which have just been selected are indeed consistent with the trajectory TR and with the envelope of admissible maximum speeds.

If these conditions are not satisfied, the device 1 displays a message (on one of its display means 24 or 33 for example) indicating that the selected time constraints are not valid and inviting the pilot to choose another set. In this case, the device 1 prompts the pilot to continue the selection of the time constraints, but in manual mode. The pilot can accept (in which case the manual selection operations are those described above) or not (in which case the procedure for selecting time constraints stops there and the automatic driving function cannot be activated). In both cases, the pilot may or may not decide to report (immediately or otherwise) to the ATC, or to another authority, the invalidity of the time constraints proposed by the ATC.

If the previous conditions are satisfied, the device 1 displays the time constraints on one of its display means, and asks the pilot to verify that he is happy with the displayed constraints and that they are consistent with the constraints provided by the ATC.

If there is inconsistency, the pilot does not validate the selected constraints. The device 1 then displays a message indicating that a selection error has occurred, and invites the pilot to select a set of constraints (or a cost index) manually.

If there is no inconsistency, the device 1 stores the set of selected time constraints and undertakes the generation of the speed profile PV.

The pilot can also choose a cost index that is global to the whole trajectory, with the aid of a means (for example the means 21) making it possible to input computer data, and comprising for example a keyboard, a mouse, a mouse wheel, a trackball, etc.

The device 1 then displays the value of the cost index entered and asks the pilot to verify and confirm his choice.

If the pilot does not confirm the displayed value (input error or choice modified as an afterthought), the device 1 keeps asking for a value until the pilot confirms his choice.

If the pilot confirms his choice, the device 1 stores the value of the cost index entered, and undertakes the generation of the speed profile PV.

On the basis of the time constraints or of the cost index, as well as on the basis of the trajectory TR stored, the means 20 of the device 1 generate a speed profile PV.

The device 1 then carries out the following operations:
- storage of the speed profile PV;
- calculation of the estimation of the total travel time for the trajectory TR, and display of this time;
- calculation of the estimation of the travel time between each waypoint and display of these times; and
- calculation of the estimation of the temperature of the brakes on arrival, and
- display of this temperature.

The third step of the sequencing, for its part, consists in arming the device 1.

In a preferred embodiment, the arming of the automatic driving function in "M/FA" mode is effective, when the automatic pilot ("A/P"), the auto-lever ("A/THRUST") (term used today for flight but which could change: "Auto-Speed" [A/SPEED] for example) and the flight director (hereinafter FD) [implementing the ground director functions within the framework of the present invention] are engaged.

When these conditions are fulfilled, the device 1 displays a message indicating that the automatic driving function is armed.

The fourth step of the sequencing consists in activating the device 1.

The activation of the automatic driving function is effective when the following conditions are fulfilled:
  the automatic driving function must be armed;
  the position and heading of the aircraft A must be consistent with the first element of the trajectory TR, that is to say the lateral and angular deviations must be below given thresholds;
  the aircraft A must be on the ground (for example, have the main landing gear and the front gear in contact with the pavement); and
  the longitudinal speed of the aircraft A must be compatible with the envelope of admissible maximum speeds, such as previously described.

When these conditions are fulfilled, the automatic driving function is activated and a message is displayed to inform the pilot thereof.

Once the function has been activated, the device 1 carries out the following calculations continuously:
  calculation of the current trajectory element, and selection of this element;
  calculation of the target point H;
  calculation of the local curve;
  calculation of the lateral deviation yc and of the angular deviation ψc.

On the basis of these elements, the device 1 formulates lateral and longitudinal guidance setpoints, as described above. These commands (yaw rate for the lateral axis, and speed or acceleration for the longitudinal axis) are dispatched to the piloting laws for the sets 14 and 27, so as to control the actuators making it possible to implement the requested commands.

On the basis of the guidance setpoints, of the trajectory TR and of the speed profile PV, the ground director (display means 24 and/or 33) enables the pilot to be informed visually of what the automatic driving function is doing and of what it is going to do. This display makes it possible to help it to guide the aircraft A in the case of manual or semiautomatic guidance, or else to monitor what the device 1 is doing in the case of completely automatic guidance.

This sequencing corresponds to the mode termed "Full-Auto" (M/FA mode), that is to say not requiring the intervention of the pilot for the control of the aircraft A. For the modes termed "Auto-Lateral" and "Visual Help", the sequencing is identical, but the commands arising from the guidance system 6 are not necessarily all used. In particular:
  in so-called "Auto-Lateral" mode, the speed command arising from the longitudinal guidance does not directly control the speed of the aircraft A, but serves to limit the speed controlled manually by the pilot, and to provide visual help to the pilot via the ground director (display means 33 for example); and
  in so-called "Visual Help" mode:
    the speed command arising from the longitudinal guidance does not directly control the speed of the aircraft A, but serves to limit the speed controlled manually by the pilot, and to provide visual help to the pilot via the ground director (display means 33 for example); and
    the yaw rate command arising from the lateral guidance does not directly control the rotation of the aircraft A (which is then controlled manually by the pilot), but serves to provide visual help to the pilot via the ground director (display means 24 for example).

The manual switch from one mode to another can be achieved as indicated hereinafter.

When the A/P, the A/THRUST and the FD are engaged, the device 1 is in M/FA mode.

The progressive disengagement of the function (switch to a lower mode) is done according to the following logic:
  M/FA→M/AL, by disconnection of the A/P or by action of the pilot on the piloting facilities allowing lateral control;
  M/AL→M/VH, by disconnection of the auto-lever or action of the pilot on the piloting facilities allowing longitudinal control;
  M/FA→M/VH, by disconnection of the A/P (giving rise to the disconnection of the auto-lever) or action of the pilot on the piloting facilities allowing longitudinal control;
  M/VH or M/AL or M/FA→Normal Manual, by disconnection of the FD (giving rise to the disconnection of the A/P and the A/THRUST if engaged); and
  Normal Manual→Direct Manual, in the event of a fault.

Such reversions may also be induced by cases of faults (loss of measurements necessary for this or that operating mode, loss of a computer, etc.).

The possible re-engagement sequences are:
  Normal Manual→M/VH, by engagement of the FD, with the proviso that the function is armed;
  M/VH→M/AL, by engagement of the A/P, with the proviso that the speed of the aircraft A, the lateral deviation yc and the angular deviation ψc are below given thresholds; and
  M/AL→M/FA, by engagement of the A/THRUST, with the proviso that the speed of the aircraft A is below a given threshold.

The switch from one mode to another can also be done automatically, in particular when the aircraft A attains the end of the trajectory (switch to Normal Manual mode), or when the device 1 switches to an unusual mode or to fault mode.

The device 1 in accordance with the invention, such as previously described, exhibits very many advantages. In particular:
  it makes it possible to reduce the workload of the pilot in the course of the rolling phase, by handling all or some (depending on the operating mode) of the guidance of the aircraft A on the ground, thereby allowing the pilot to concentrate on other tasks, in particular on monitoring the exterior environment (movements of other vehicles, surrounding obstacles) and on communications with the air/ground traffic control;
  it makes it possible to guarantee the position of the aircraft A with respect to the axis of the runway, of the trafficway, or of any other element of the airport domain, and therefore:
    to guarantee the guidance of aircraft whose relative length with respect to the dimensions of the trafficways may pose difficulties (namely the risk of wheels departing from the pavement), doing so without using any additional device intended to aid the pilot (exterior camera); and
    to facilitate the circulation of the aircraft A in visibility conditions which make it difficult to guide the aircraft A, doing so without using exterior aids such as a vehicle to be followed;
  it makes it possible to generate guidance commands aimed at improving the comfort of the passengers and crew (with respect to manual piloting), in particular in curves and turns, as well as when accelerating and braking;
  it makes it possible to optimize the travel time between two points of the airport domain, and therefore to reduce the occupancy time of the runways, trafficways or any other element of the airport domain;
  it makes it possible to predict, for example before the aircraft A lands, the occupancy time of the runways, linkways or any other element of the airport domain, and therefore to allow the air/ground traffic control to anticipate any ground circulation problems and to adapt the airport scheduling accordingly;

it makes it possible to guarantee that the aircraft A passes certain waypoints and at a given time, thereby allowing the air/ground traffic control to optimize the scheduling so as to keep the ground traffic flowing;

it allows airlines to improve the predictions of usage of the actuators, in particular of the engines (consumption during ground rolling) and of the brakes (estimation of the wear of the brakes), thereby affording advantages in terms of maintenance; and it makes it possible to optimize a compromise between the performance (in terms of trajectory travel time) and the wear of the actuators, as a function of the strategy adopted by the pilot or the airline.

The invention claimed is:

1. An automatic device that controls the driving of an aircraft along a ground path of an airport domain, the device comprising:
    an information entering unit in which information relating to the ground path is entered;
    a current value measuring unit that automatically measures current values of parameters of the aircraft;
    a constraint entering unit in which constraints relating to the aircraft ground path are entered;
    a navigation system which comprises:
        a ground rolling trajectory determining unit that automatically determines, with the aid of said entered information from said information entering unit, a ground rolling trajectory, and
        a speed profile determining unit that automatically determines, with the aid of said entered constraints, a speed profile of said ground rolling trajectory, which provides a variation of longitudinal speed of the aircraft along said ground rolling trajectory;
    a guidance system which comprises:
        a yaw rate setpoint determining unit that automatically determines, with the aid of current values measured by said current value measuring unit and of said ground rolling trajectory received from said navigation system, a yaw rate setpoint enabling the aircraft to follow said ground rolling trajectory by application of a yaw rate command, and
        a longitudinal speed setpoint determining unit that automatically determines, with the aid of the measured current values of the aircraft, of said ground rolling trajectory and of said speed profile, a longitudinal speed setpoint which represents a longitudinal speed command to drive the aircraft along said ground rolling trajectory while complying with said speed profile; and
    a piloting aid system comprising a piloting aid unit, wherein said piloting unit comprises:
        a first set, wherein the first set is comprised of:
            a first control unit which controls aircraft components that act on yaw motion of the aircraft rolling on the ground;
            a first calculation unit which automatically calculates setpoints to be applied to said first control unit, said setpoints being applied to said first control unit to enable said first control unit to pilot the aircraft laterally according to said yaw rate command received from said guidance system, and
            a first applying unit which automatically applies the commands calculated by the first calculation unit to said first control unit, and
        a second set, wherein the second set is comprised of:
            a second control unit which controls aircraft components that act on longitudinal speed of the aircraft,
            a second calculation unit which automatically calculates setpoints to apply to the second control unit according to said longitudinal speed setpoint determined by said longitudinal speed setpoint determination unit, and
            a second applying unit which automatically applies the setpoints calculated by the second calculation unit to said second control unit.

2. The device as claimed in claim 1,
wherein said piloting aid system comprises a first display unit which displays, on at least one viewing screen, first characteristic signs illustrating said yaw rate setpoint.

3. The device as claimed in claim 1,
wherein:
said piloting aid system further comprises a piloting aid unit which uses said yaw rate setpoint to aid the piloting of the aircraft and which comprises a second display unit which displays, on at least one other viewing screen, second characteristic signs illustrating said longitudinal speed setpoint.

4. A method for automatically driving an aircraft along a ground path of an airport domain, comprising:
    A/ implementing a navigation function in a navigation system, in which the navigation system:
        a) receives information relating to the ground path; and
        b) automatically determines, with the aid of said received information, a ground rolling trajectory;
    B/ implementing a guidance function in a guidance system, in which the guidance system:
        a) automatically measures current values of parameters of the aircraft; and
        b) automatically determines with the aid of at least one current value of said measured current values and of said ground rolling trajectory, a yaw rate setpoint enabling the aircraft to follow said ground rolling trajectory by application of a yaw rate command; and
    C/ implementing a function for aiding piloting of the aircraft, for which an onboard piloting aid system uses said yaw rate setpoint to aid the piloting of the aircraft,
wherein:
in step A/ the navigation system:
    c) receives constraints relating to the ground path of the airport domain, and
    d) automatically determines, with the aid of said received constraints, a speed profile of said ground rolling trajectory, said speed profile providing a variation of longitudinal speed the aircraft along said ground rolling trajectory;
in step B/ the guidance system automatically determines, with the aid of the measured current values of parameters of the aircraft, of said ground rolling trajectory and of said speed profile, a longitudinal speed setpoint which represents a longitudinal speed command to drive the aircraft along said ground rolling trajectory while complying with said speed profile; and
in step C/, the onboard piloting aid system is configured to calculate setpoints from said yaw rate command received from the guidance system and apply the setpoints to control yaw motion of the aircraft.

* * * * *